United States Patent [19]

Sato et al.

[11] 4,450,681

[45] May 29, 1984

[54] CARBON PARTICULATES CLEANING DEVICE FOR DIESEL ENGINE

[75] Inventors: Susumu Sato, Okazaki; Yukihisa Takeuchi, Aichi; Masahiro Tomita, Anjo; Shigeru Kamiya, Chiryu; Shigeru Takagi, Anjo, all of Japan

[73] Assignee: Nippon Soken, Inc., Nishio, Japan

[21] Appl. No.: 525,210

[22] Filed: Aug. 22, 1983

Related U.S. Application Data

[63] Continuation of Ser. No. 480,381, Apr. 5, 1983, abandoned, which is a continuation of Ser. No. 238,623, Feb. 26, 1981, abandoned.

[30] Foreign Application Priority Data

Mar. 4, 1980 [JP] Japan .................................. 55-27164

[51] Int. Cl.³ .............................................. F01N 3/02
[52] U.S. Cl. .................................. 60/286; 60/288; 60/303; 60/311; 431/262; 431/326
[58] Field of Search ................ 60/286, 288, 297, 303, 60/311; 431/262, 300, 325, 326

[56] References Cited

U.S. PATENT DOCUMENTS

| | | | |
|---|---|---|---|
| 1,800,726 | 4/1931 | Grant | 431/326 |
| 2,307,007 | 1/1943 | Alain | 431/326 |
| 2,946,651 | 7/1960 | Houdry | 60/274 |
| 3,199,505 | 8/1965 | Lloyd | 431/262 |
| 3,203,168 | 8/1965 | Thomas | 60/286 |
| 3,503,716 | 3/1970 | Berger | 60/286 |
| 3,724,220 | 4/1973 | Tanasawa | 60/286 |
| 3,779,015 | 12/1973 | Maruoka | 60/286 |
| 3,849,055 | 11/1974 | Stanley | 431/262 |
| 4,054,418 | 10/1977 | Miller | 60/297 |
| 4,167,852 | 9/1979 | Ludecke | 60/311 |

FOREIGN PATENT DOCUMENTS 47-23613  1/1972  Japan .................................. 60/286

*Primary Examiner*—Douglas Hart
*Attorney, Agent, or Firm*—Cushman, Darby & Cushman

[57] ABSTRACT

A carbon particulates cleaning device comprises a carbon particulates catching means, a fuel injecting means, a fuel retaining means for retaining the fuel injected by the fuel injecting means near the carbon particulates catching means, a fuel igniting means for igniting the fuel retained by the fuel retaining means, and a gas blowing means which blows gas for maintaining the fuel burning and applying the heat of the burning fuel into the carbon particulates caught by the carbon particulates catching means. The carbon particulates caught by the carbon particulates catching means are effectively burnt and eliminated by supplying gas which is heated due to the burning heat of the fuel ignited by the fuel igniting means.

13 Claims, 11 Drawing Figures

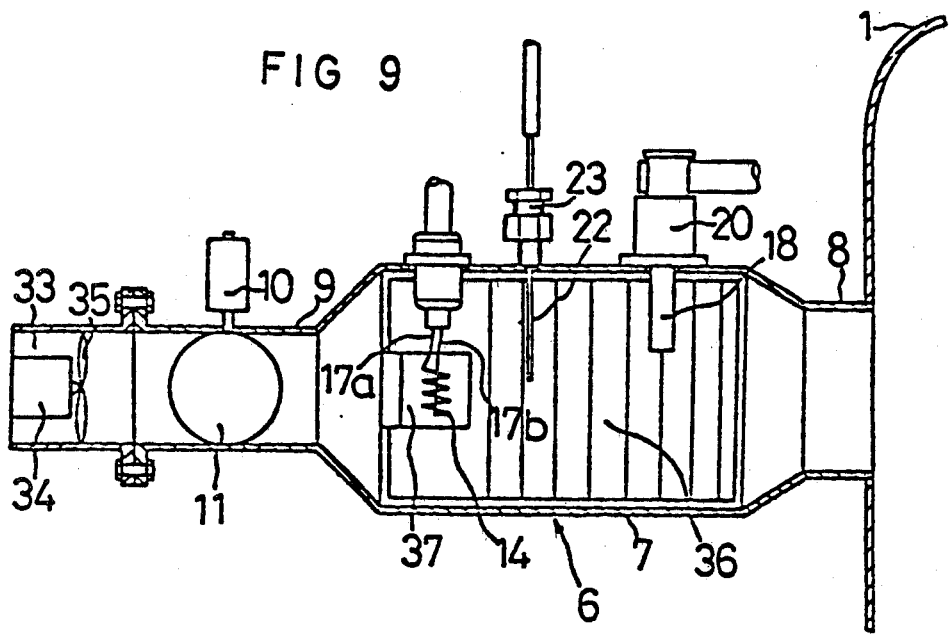
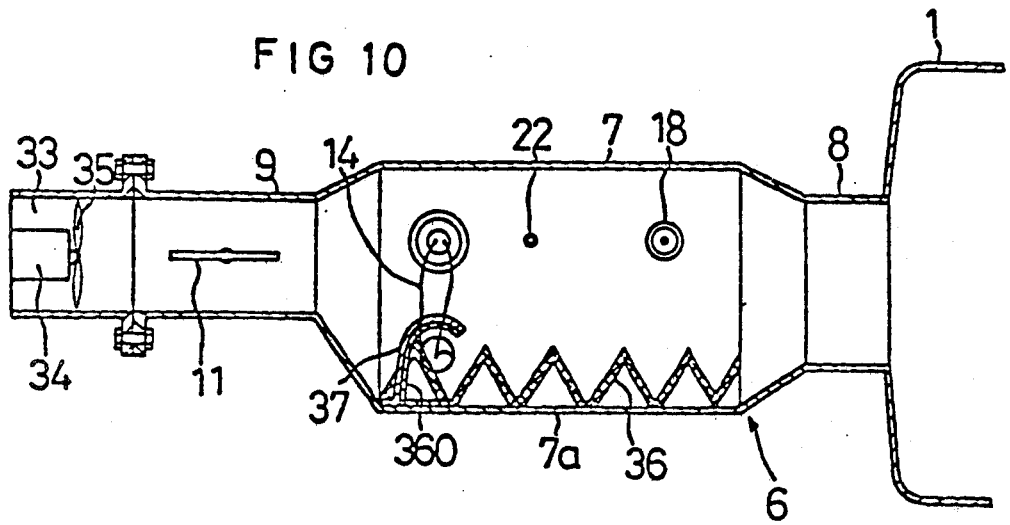

CARBON PARTICULATES CLEANING DEVICE FOR DIESEL ENGINE

This is a continuation of application Ser. No. 480,381 filed Apr. 5, 1983, abandoned upon the filing hereof, which was a continuation of Ser. No. 238,623 filed Feb. 26, 1981, now abandoned.

BACKGROUND OF THE INVENTION

The present invention relates to a carbon particulates cleaning device for eliminating particulates mainly composed of carbon, which are contained within an exhaust gas discharged from a diesel engine of an automobile or the like, particularly to a carbon particulates cleaning device provided with a carbon particulates catching member and a cleaning means for burning and cleaning the carbon particulates caught by the carbon particulates catching member in an exhaust gas passage of the diesel engine.

In the cleaning device which cleans the particulates mainly composed of carbon (hereinafter, called carbon particulates) conained within the exhaust gas of the diesel engine, a carbon particulates catching member such as a filter member has been conventionally used.

However, the carbon particulates catching member of this type is apt to be clogged by the carbon particulates when the amount of the carbon particulates caught by the carbon particulates catching member is increased.

In order to prevent the carbon particulate catching member from being clogged by the carbon particulates, the device provided with a cleaning means for heating and burning the carbon particulates caught by the carbon particulates catching member, has been proposed.

One object of the present invention is to provide a carbon particulates cleaning device provided with a carbon particulates catching means disposed in an exhaust gas passage and a cleaning means which ignites the fuel by a fuel igniting means near the carbon particulates catching means and burns the carbon particulates caught by the carbon particulates catching means due to the burning heat of the fuel.

Another object of the present invention is to provide a carbon particulates cleaning device which effectively burns and eliminates the carbon particulates caught by the carbon particulates catching means by a small amount of fuel and electric energy consumption.

DESCRIPTION OF THE DRAWINGS

Other objects and advantages of the invention will become apparent from the following description of embodiments with reference to the accompanying drawings wherein:

FIG. 2 is a partially cut away perspective view of the whole device of the first embodiment and also shows piping and wiring thereof;

FIG. 3 is a horizontally sectioned view of a cleaning means of the first embodiment;

FIG. 4 is a longitudinally sectioned view of the cleaning means of the first embodiment;

FIG. 6 is partially cut away perspective view of the whole device of the second embodiment and also shows piping and wiring thereof;

FIG. 7 and FIG. 8 are a horizontally sectioned view and a longitudinally sectioned view of a cleaning means of the second embodiment respectively;

FIG. 9 and FIG. 10 are a horizontally sectioned view and a longitudinally sectioned view of a cleaning means of a third embodiment respectively.

SUMMARY OF THE INVENTION

The carbon particulates cleaning device of the present invention comprises a carbon particulates catching means, a fuel injecting means, a fuel retaining means for retaining the fuel injected by the fuel injecting means near the carbon particulates catching means, a fuel igniting means for igniting the fuel retained by the fuel retaining means and a gas blowing means which blows gas for maintaining the fuel burning and applying the heat of the burning fuel into the carbon particulates caught by the carbon particulates catching means.

According to the device of the present invention, after the fuel is ignited by the fuel igniting means, the burning of the fuel is maintained by blowing gas thereinto. Therefore, electric energy consumption required to burn the fuel can be largely reduced.

Furthermore, in the device of the present invention, since the burning heat of the fuel which is retained by the fuel retaining means is used for burning the carbon particulates, unburnt fuel droplets are neither blown into the carbon particulates catching means nor attached thereto. Therefore, fuel consumption can be largely reduced, too.

DETAILED DESCRIPTION OF THE INVENTION

Hereinafter, the present invention will be explained in detail in accordance with several embodiments.

Figure 1:
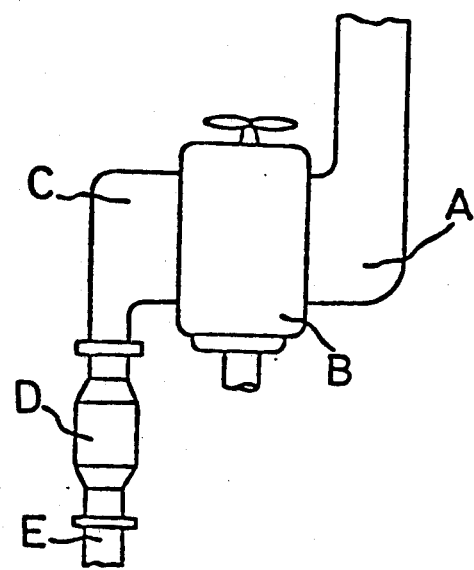
FIG. 1 shows an attaching position of the carbon particulates cleaning device of the present invention.

In FIG. 1, reference character A designates an intake pipe. The carbon particulates cleaning device D of the present invention is disposed between an exhaust manifold C and an exhaust pipe E and catches, and cleans carbon particulates contained within the exhaust gas which is discharged from an engine B.

Figure 2:
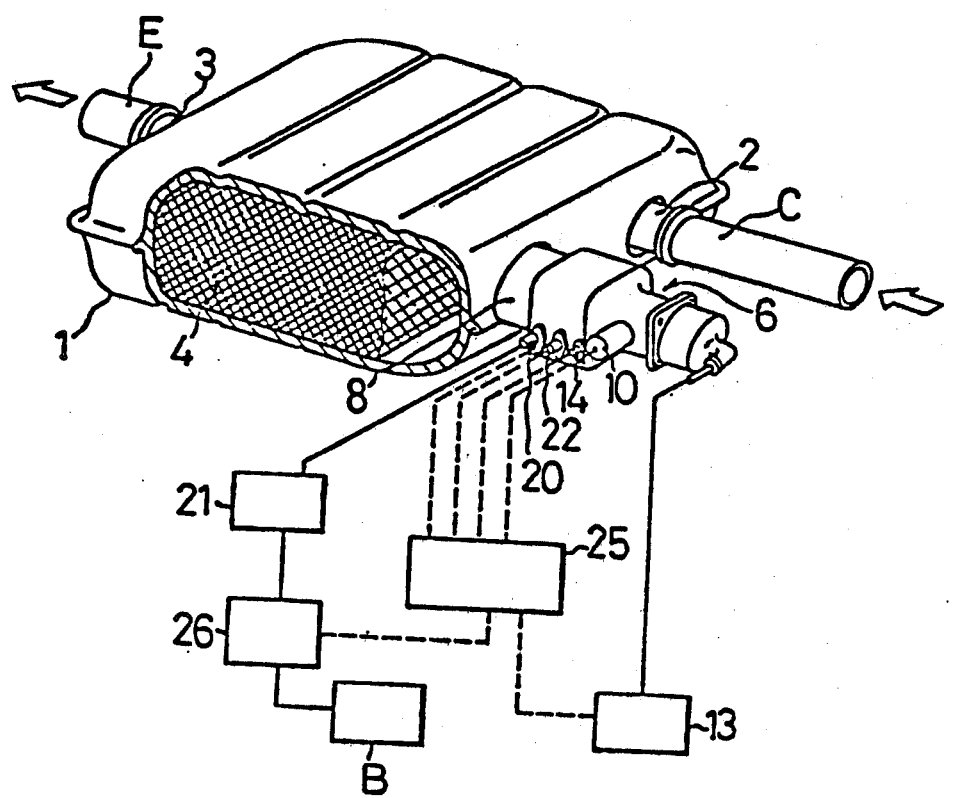
FIG. 2 to FIG. 4 show a first embodiment.
Figure 3:
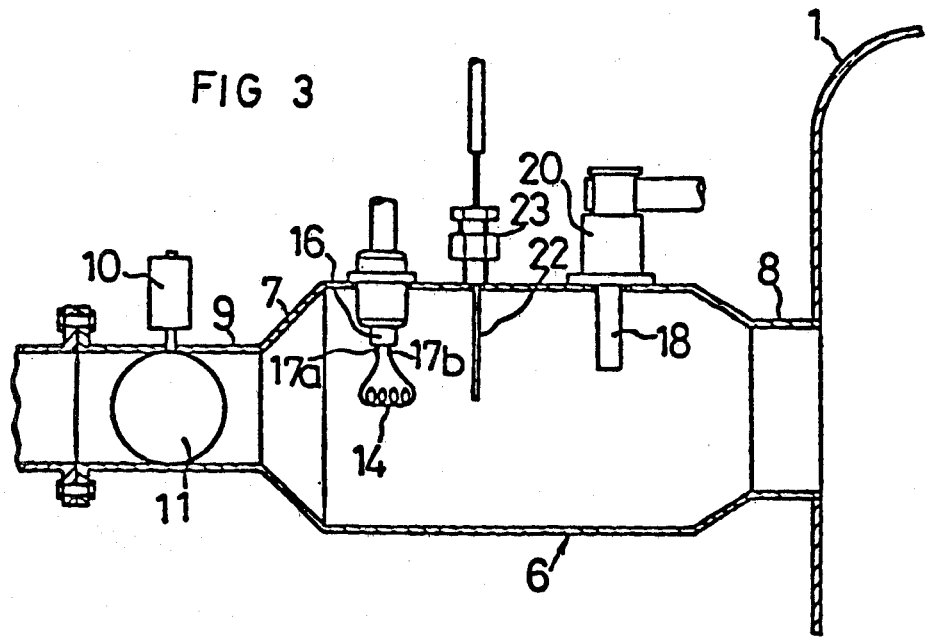
Figure 4:
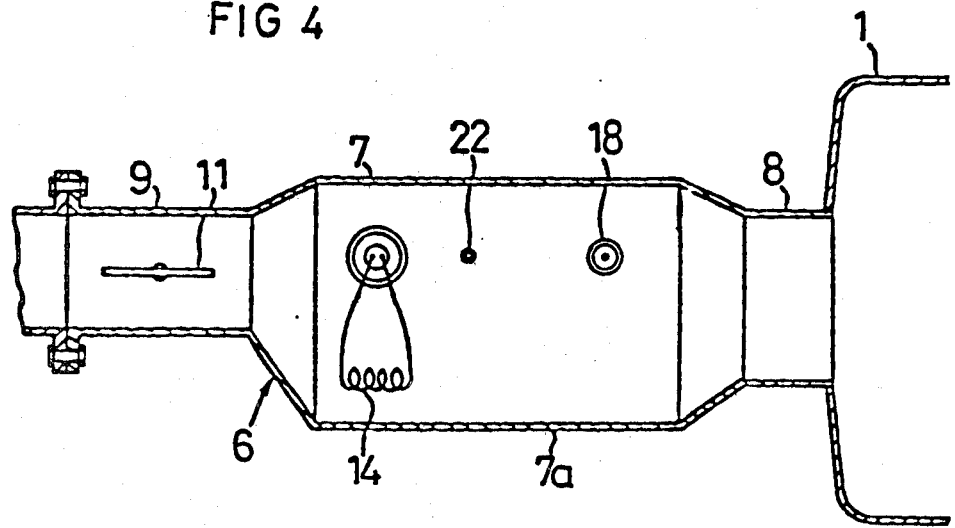

In the first embodiment shown in FIG. 2 to FIG. 4, a main case 1 is made of stainless steel and is provided with an exhaust gas inlet pipe 2 and an exhaust gas outlet pipe 3 which are connected to the exhaust manifold C and the exhaust pipe E respectively.

Within the main case 1, a filter member 4 operating as a carbon particulates catching means is accomodated so as to be slightly spaced from the exhaust gas inlet pipe 2.

The filter member 4 is made of heat resistant porous material such as foamed ceramic, metallic wire mesh or ceramic coated metallic wire mesh.

And heat resistant adiabatic member (not shown) is interposed between the outer periphery of the filter member 4 and the inner periphery of the main case 1.

The main case 1 is provided with a cleaning means 6 which burns and cleans the carbon particulates caught by the filter member 4, on the side of the exhaust gas inlet pipe 2.

In FIGS. 3 and 4, a fuel burning case 7 of the cleaning means 6 is made of stainless steel. One end of the fuel burning case 7 is connected to the main case 1 through a pipe portion 8 and the other end of the fuel burning case 7 is formed into a pipe portion 9 wherein a blast valve 11 which controls the supplying amount of the blown gas such as air, operated by a motor 10, is disposed. The fuel burning case 7 also operates as a gas blowing pipe of a gas blowing means.

In the bottom portion of the fuel burning case 7, a fuel storage portion 7a is formed by forming a fuel vessel within the gas blowing pipe so as to open thereinto.

A nicrome wire heater 14 operating as a fuel igniting means is disposed within the fuel burning case 7. Both ends of the nicrome heater 14 are connected to terminals 17a and 17b which are respectively fixed to an insulator 16 provided in the fuel burning case 7 near the blast valve 11.

A nozzle 18 operating as a fuel injecting means is fixed to the fuel burning case 7. The fuel is injected through the nozzle 18, controlled by an electromagnetic valve 20.

An alumel-chromel thermocouple 22 operating as a fuel ignition detecting means is fixed to the fuel burning case 7. And an end portion of the fuel burning case 7 wherein the blast valve 11 is provided, is communicated with an air pump 13 which operates in accordance with a crank shaft (not shown) of the engine B through a clutch (not shown). Thus, the gas blowing means is constructed.

And the fuel injecting nozzle 18 is communicated with a fuel supplying system of the engine B through a fuel pump 21, and a fuel consumption detector 26.

The fuel consumption detector 26 indirectly detects the amount of the carbon particulates caught by the filter member 4, which is nearly proportional to the fuel consumption. As the fuel consumption detector 26, a well known vane type or float type detector is used.

The clutch device of the air pump 13, the motor 10, the nicrome wire heater 14, the thermocouple 22, the electromagnetic valve 20 are electrically connected to a control circuit 25. And the control circuit 25 is electrically connected to the fuel consumption detector 26.

The air pump 13, the motor 10, the nicrome wire heater 14 and the electromagnetic valve 20 are controlled by the control circuit 25 which receives electrical signals from the fuel consumption detector 26 and the fuel ignition detector 22.

Figure 5:
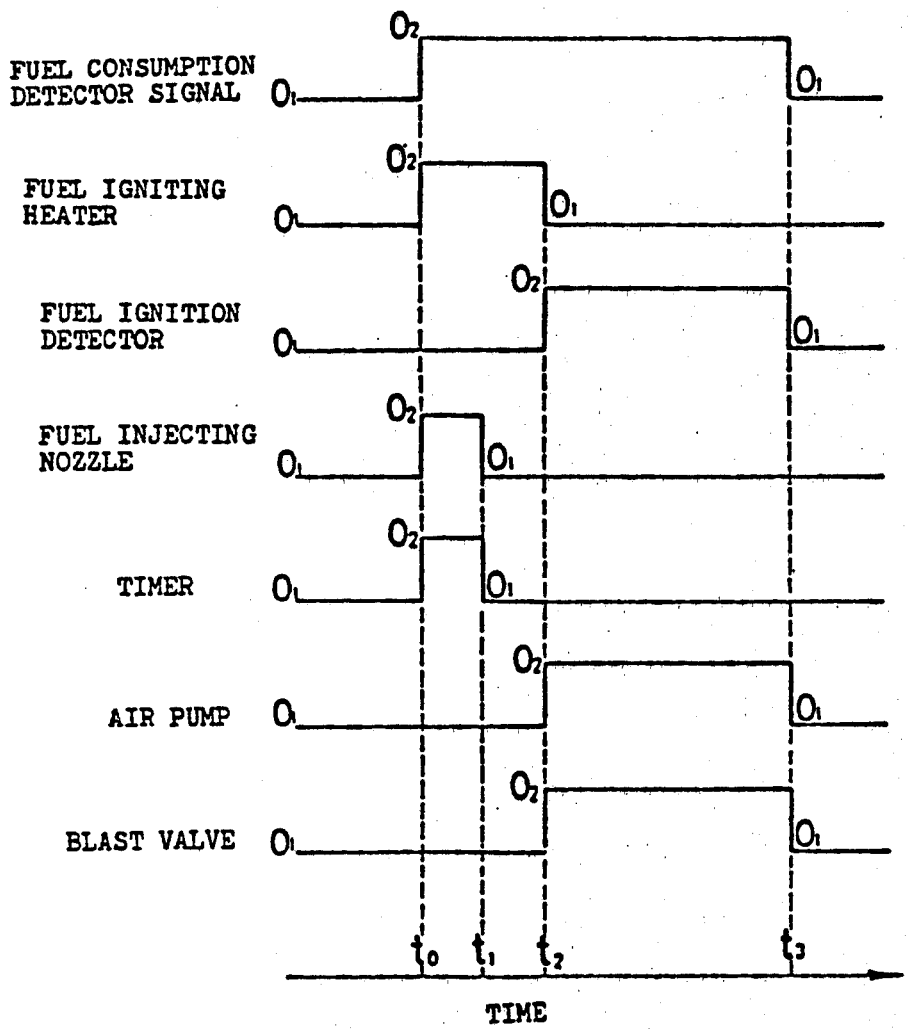
FIG. 5 is a flow chart of the carbon particulates cleaning operation.

Hereinafter, the operation of the carbon particulates cleaning device of the present invention having the above described construction will be explained with reference to the flow chart of FIG. 5. In FIG. 5, reference character $O_1$ designates the condition of OFF and $O_2$ designates the condition of ON.

The exhaust gas discharged from the engine B is introduced into the main case 1 through the exhaust gas inlet pipe 2 and then discharged from the exhaust gas outlet pipe 3 through the filter member 4.

The carbon particulates contained within the exhaust gas are caught by the filter member 4.

When the amount of fuel consumed in the engine B reaches a predetermined amount after a predetermined time ($t_0$ in FIG. 5), the amount of carbon particulates caught by the filter member 4 is increased and approaches a predetermined amount. At this time, from the fuel consumption detector 26, an operation starting signal is supplied into the contral circuit 25. Then, electric current is supplied to the electromagnetic valve 20 of the fuel injecting nozzle 18, and the nicrome wire heater 14 so that the fuel is injected from the fuel injecting nozzle 18 and the nicrome wire heater 14 starts heating the fuel. At this time, a timer for controlling the fuel injecting time, starts the operation thereof.

At the time of $t_1$, the timer becomes OFF and the fuel injecting nozzle 18 is closed. The fuel injected from the fuel injecting nozzle 18 is retained in the fuel storage portion 7a and is heated by the nicrome wire heater 14.

When the fuel is ignited, the electrical signal generated by the fuel ignition detector 22 becomes ON and receiving the electrical signal from the control circuit 25, the heater 14 becomes OFF condition.

And the blast valve 11 is opened and the clutch of the air pump 13 simultaneously becomes ON condition so that the gas starts being down into the fuel burning case 7. The blown gas makes the fuel burn continuously by supplying oxygen to the fuel and the blown gas is heated by the burning heat of the fuel. Then, the heated gas is introduced within the main case 1. And due to the heat of the heated gas, the carbon particulates caught by the filter member 4 is burnt and cleaned.

Next, the gas blowing operation is stopped so that the burning of the fuel is finished. Then, the electrical signal of the fuel ignition detector 22 becomes OFF at the time of $t_3$ and the electrical signal of the fuel consumption detector 26 is simultaneously initialized so that the air pump 13 and the blast valve 11 are closed.

As described above, the carbon particulates cleaning device of the present invention starts its operation when the carbon particulates caught by the filter member 4 reaches a predetermined amount. And after the carbon particulates are burnt and cleaned, the operation thereof is stopped.

The heater 14 only operates to ignite the fuel. After the fuel is ignited by the heater 14, the fuel is continuously burnt by the blown gas.

Therefore, the fuel consumption and the electric power consumption can be decreased to a minimum.

And since the fuel is burnt within the fuel storage portion 7a of the fuel burning case 7 and the blown gas which is heated within the fuel burning case 7 is supplied into the filter member 4, unburnt fuel droplets are neither supplied to the filter member 4 nor adhered thereto.

Furthermore, by providing the fuel ignition detecting means, the fuel ignition can be surely detected so that the unburnt fuel is prevented from being discharged together with the blown gas.

And since the blown gas is heated by fuel flame up to a high temperature and then is supplied into the filter member 4, the time required to clean the carbon particulates can be made short.

Figure 6:
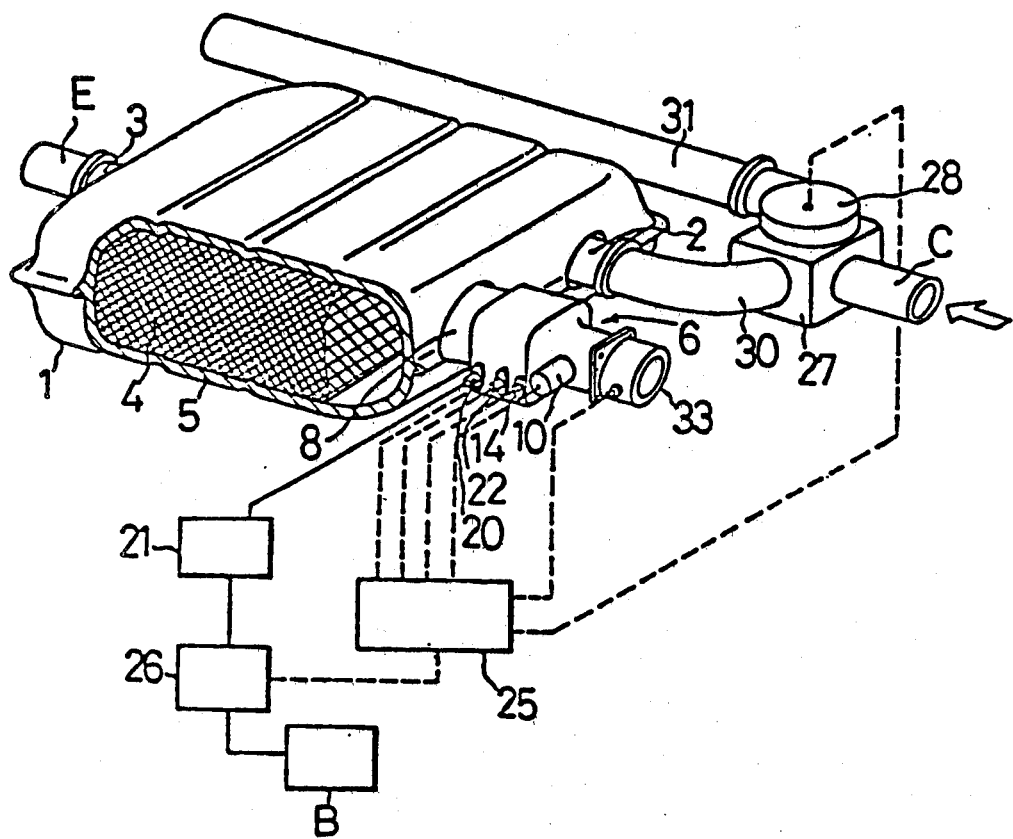
FIG. 6 to FIG. 8 show a second embodiment.
Figure 7:
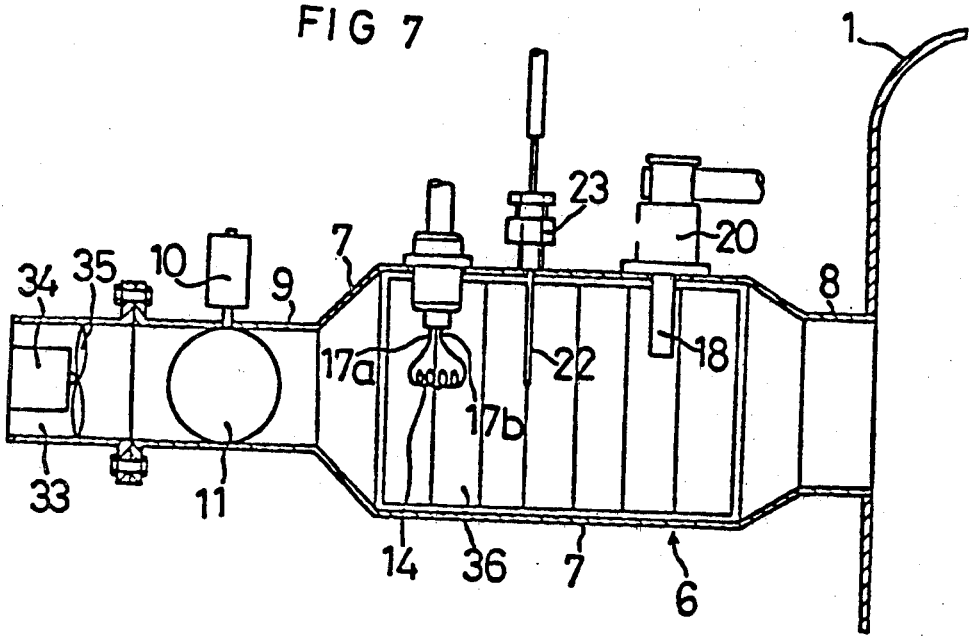
Figure 8:
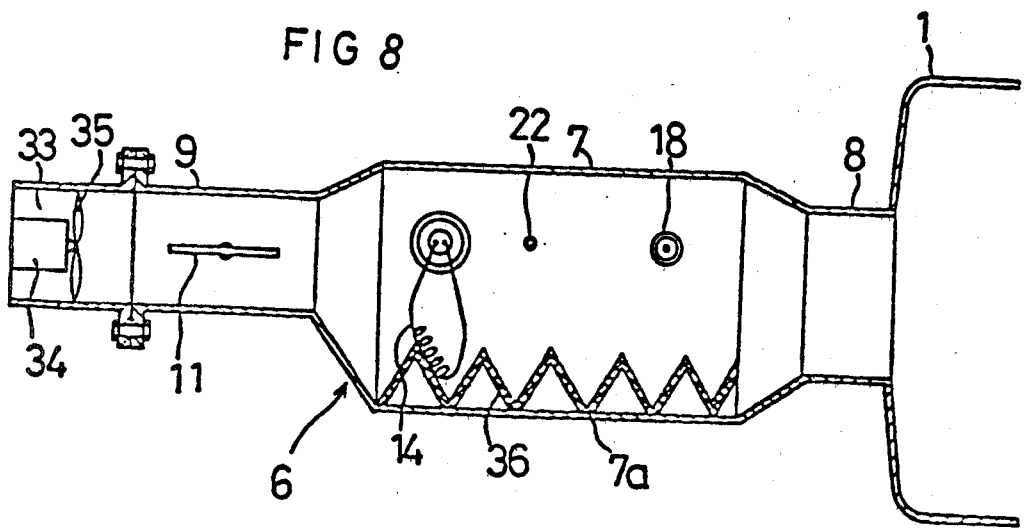

FIG. 6 to FIG. 8 show a second embodiment of the present invention.

An exhaust gas passage communicated with the exhaust manifold C is diverged into two exhaust gas passages. A first exhaust gas passage 30 is communicated with the main case 1 and a second exhaust gas passage 31 directly communicated with the exhaust pipe E for bypassing the exhaust gas.

In the diverging portion of the first and second exhaust gas passages, a valve 27 which is operated by a motor 28 is provided for changing the flowing passage of the exhaust gas.

And as the gas blowing means, a blower 33 composed of a motor 34 and a fan 35 which is operated by the motor 34 is provided on the upper stream side of the blast valve 11. And the motor 28 and the motor 34 are connected to the control circuit 25 respectively.

When the cleaning means 6 starts the operation thereof, receiving the electrical signal from the fuel consumption detector 26, the valve 27 closes the first exhaust gas passage 30 which is communicated with the main case 1 and opens the second exhaust gas passage 31. And the blower 33 is controlled so as to start its operation upon receiving the ignition signal from the thermocouple 22.

Within the fuel storage portion 7a which is formed in the bottom portion of the fuel burning case 7, a wave shaped fuel retaining member 36 which is produced by weaving ceramic fibers like a cloth, is disposed.

Instead, the fuel retaining member can be also formed from the heat resistant material having minute cavities for retaining fuel, such as foamed ceramic and knitted ceramic coated metallic wire.

Other construction of the second embodiment is substantially equal to that of the first embodiment.

According to the second embodiment, while the cleaning means 6 operates, the exhaust gas does not flow into the main case 1. Therefore, the heat of the blown gas is used only to burn the carbon particulates without being consumed to heat the exhaust gas. Consequently, the heat efficiency is good.

Furthermore, since the wave-shaped fuel retaining member having minute open passages for impregnating the fuel therein, is provided in the fuel storage portion, the fuel does not move largely due to vibrations when the fuel is injected, and the fuel flame is also stabilized.

In this case, it is preferable to attach catalyst metal such as platinum and platinrhodium to at least one portion of the fuel retaining member in order to ignite and burn the fuel easily.

FIG. 9 and FIG. 10 show a third embodiment of the present invention.

In the cleaning means 6 of the third embodiment, one end portion 360 of the wave-shaped fuel retaining member 36 made of ceramic fibers is formed into a band shape having width nearly equal to that of the nicrome wire heater 14 and is projected upwardly so as to surround the heater 14.

The projected end portion 360 of the fuel retaining member 36 is supported by a stay 37 made of stainless steel, of which one end is fixed to the bottom portion of the fuel burning case 7.

Other construction of the third embodiment is substantially equal to that of the second embodiment.

In the cleaning means 6 of the third embodiment, the fuel moves upwardly along the projected end portion 360 and is evaporated and ignited by the heater 14 so that the fuel can be easily ignited.

And after the fuel is ignited, the fuel flame is not blown out by the blown gas, since the fuel flame is protected from the blown gas by the projected end portion 360. Therefore, the projected end portion 360 contributes to the stable fuel burning.

Figure 11:
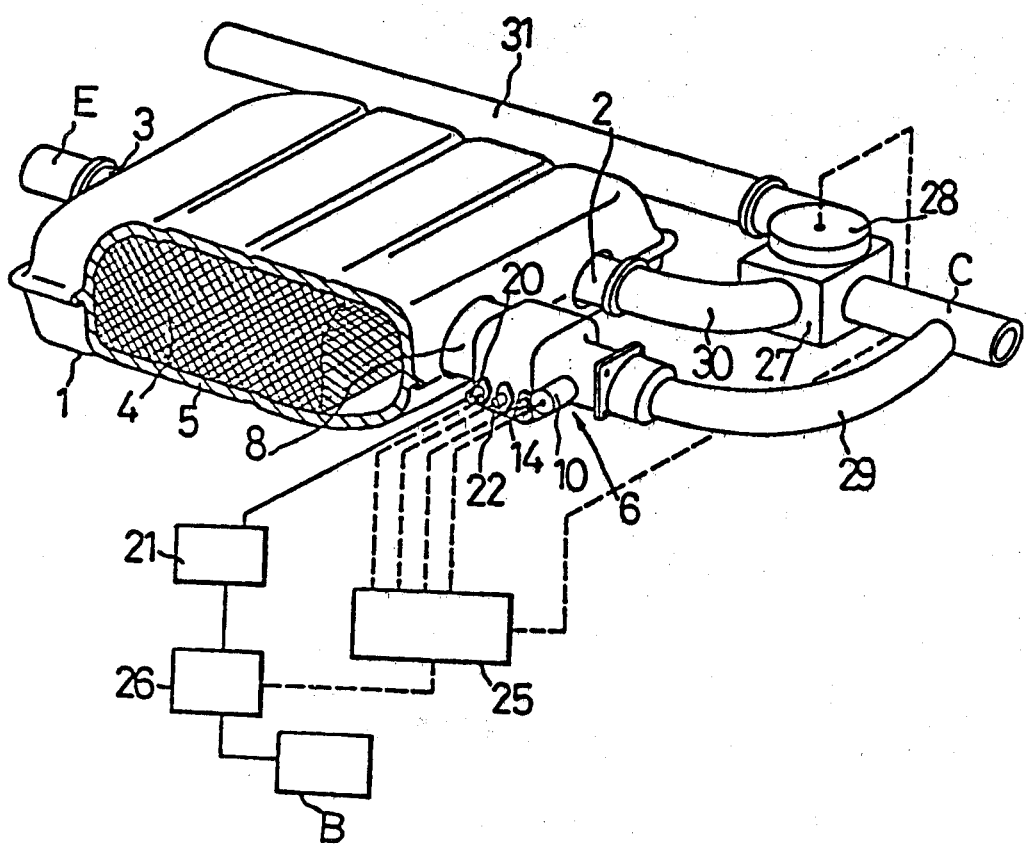
FIG. 11 is a partially cut away perspective view of the whole device of a fourth embodiment and also shows piping and wiring thereof.

FIG. 11 shows a fourth embodiment of the present invention.

In the cleaning means 6 of the fourth embodiment, exhaust gas is used as the blown gas.

One portion of the exhaust gas is introduced into the cleaning means 6 by a branch pipe 29 which is diverged from the exhaust manifold C.

This embodiment is possible only when the exhaust gas contains oxygen which makes the injected fuel and the caught carbon particulates burn.

The amount of the blown exhaust gas is changed according as the engine driving condition.

However, in the device of the fourth embodiment, wherein the fuel retained within the fuel burning case is burnt, the change of the amount of the blown exhaust gas does not largely affect the performance of the cleaning means.

In this case, it is preferable to control the amount of blown exhaust gas by adjusting the opening of the blase valve.

The opening of the blast valve is easily adjusted by using the means for operating the blast valve in accordance with the engine speed.

In the device of the present invention, by controlling the blast valve 11 so as to slightly open when the fuel is ignited by the heater 14, the ignition of the fuel can be easily operated.

Furthermore, the fuel injection means may be controlled so that the fuel is injected into the fuel burning case at the same time when the electric current is supplied to the heater 14 by the amount required for igniting the fuel and that after being ignited, the fuel is continuously supplied little by little by the amount required to maintain the burning of the fuel, or intermittently supplied by a predetermined amount.

By controlling the fuel injecting means as described above, the fuel may be retained within the fuel burning case by the amount nearly equal to that required to burn the carbon particulates caught by the filter member 4.

Therefore, the unburnt fuel is not discharged from the device of the present invention.

And if the engine is stopped when the carbon particulates cleaning device operates, the amount of unburnt fuel remaining within the fuel burning case can be made small.

Having now fully described the invention, it will be apparent to one of ordinary skill in the art that many changes and modifications can be made thereto without departing from the spirit or scope of the invention as set forth herein.

What is claimed is:

1. A carbon particulates cleaning device for catching and cleaning carbon particulates contained within an exhaust gas discharged from a diesel engine of an automobile or the like through an exhaust gas passage, comprising:
   a carbon particulates catching means which is disposed within said exhaust gas passage for catching said carbon particulates contained within said exhaust gas;
   a carbon particulates volume detecting means for detecting the volume of carbon particulates caught by said carbon particulates catching means and generating an electrical signal when the volume of carbon particulates reaches a predetermined volume;
   a fuel injecting means for injecting fuel near said carbon particulates catching means for a predetermined period of time;
   a fuel retaining means which is provided near said carbon particulates catching means for retaining the fuel injected by said fuel injecting means;
   a fuel igniting means which is provided near said fuel retaining means for igniting the fuel retained by said fuel retaining means;
   a fuel ignition detecting means which is provided near said fuel retaining means for detecting that the fuel retained by said fuel retaining means is ignited by said fuel igniting means and generating an electrical signal while the fuel retained by said fuel retaining means burns;

a gas blowing means which is provided near said fuel retaining means for blowing gas containing oxygen into the fuel ignited by said fuel igniting means in order to maintain the burning of said fuel after the operation of said fuel igniting means is finished and applying burning heat of the ignited fuel to said carbon particulates caught by said carbon particulates catching means; and a control means which is electrically connected to said carbon particulates volume detecting means, said fuel ignition detecting means, said fuel injecting means, said fuel igniting means and said gas blowing means;

said control means being constructed so as to start the operation of said fuel injecting means and said fuel igniting means upon receiving said electrical signal from said carbon particulates volume detecting means, and stop the operation of said fuel igniting means while starting the operation of said gas blowing means upon receiving said electrical signal from said fuel ignition detecting means.

2. A carbon particulates cleaning device according to claim 1, wherein:

said carbon particulates catching means comprises:
a case provided in said exhaust gas passage; and
a filter member made of heat resistant material, which is accommodated within said case.

3. A carbon particulates cleaning device according to claim 2, wherein:

said gas blowing means comprises:
a gas blowing pipe, one end of which is communicated with said case, and the other end of which is communicated with the air;
an air pump which is provided within said gas blowing pipe;
a valve means which is provided within said gas blowing pipe on the downstream side of said air pump; and
a valve operating means which is electrically connected to said control means for opening and closing said valve means.

4. A carbon particulates cleaning device according to claim 2, wherein:

said gas blowing means comprises:
a gas blowing pipe, one end of which is communicated with said case and the other end of which is communicated with said exhaust passage;
a valve means which is provided within said gas blowing pipe; and
a valve operating means which is electrically connected to said control means for opening and closing said valve means.

5. A carbon particulates cleaning device according to claim 4, wherein:

said gas blowing means further comprises:
a blower which is electrically connected to said control means to operate when said valve means is opened.

6. A carbon particulates cleaning device according to claim 3, wherein:

said fuel retaining means comprises:
a fuel vessel formed within said gas blowing pipe so as to open thereinto.

7. A carbon particulates cleaning device according to claim 6, wherein:

said fuel retaining means further comprises:
a porous heat resistant retaining member which is provided within said fuel vessel to be impregnated with said fuel injected by said fuel injecting means.

8. A carbon particulates cleaning device according to claim 1, wherein:

said fuel injecting means comprises:
a fuel supplying pipe communicated with a fuel source;
a nozzle member which is communicated with said fuel supplying pipe to inject said fuel into said fuel retaining means; and
a valve means which is electrically connected to said control means to open and close said fuel supplying pipe, operated by said control means.

9. A carbon particulates cleaning device according to claim 1, wherein:

said fuel igniting means comprises:
a resistance wire heater which is electrically connected to said control means.

10. A carbon particulates cleaning device according to claim 1, wherein:

said fuel ignition detecting means comprises:
a thermocouple which detects the burning temperature of the fuel ignited by said fuel igniting means.

11. A carbon particulates cleaning device according to claim 1, wherein:

said exhaust gas passage is diverged into two branch passages;
said carbon particulates catching means is provided in at least one of said two branch passages; and
a valve means is provided in the diverging portion of said two branch passages for selectively opening and closing said two branch passages so that said exhaust gas is not supplied into said carbon particulates catching means when said fuel igniting means and said gas blowing means operate.

12. A carbon particulates cleaning device according to claim 2, wherein:

said filter member is made of foamed ceramic, metallic wire mesh or ceramic coated metallic wire mesh.

13. A carbon particulates cleaning device according to claim 1, wherein:

said carbon particulates volume detecting means is a fuel consumption detector which indirectly detects the volume of carbon particulates caught by said carbon particulates catching means.

* * * * *